(12) United States Patent
Nichols (10) Patent No.: US 6,534,986 B2
(45) Date of Patent: Mar. 18, 2003

(54) PERMANENTLY EMPLACED ELECTROMAGNETIC SYSTEM AND METHOD FOR MEASURING FORMATION RESISTIVITY ADJACENT TO AND BETWEEN WELLS

(75) Inventor: Edward Nichols, Berkeley, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/837,104

(22) Filed: Apr. 18, 2001

(65) Prior Publication Data

US 2002/0000808 A1 Jan. 3, 2002

Related U.S. Application Data

(60) Provisional application No. 60/200,856, filed on May 1, 2000.

(51) Int. Cl.$^7$ .............................. G01V 3/00; G01V 3/08; G01V 3/26
(52) U.S. Cl. .................. 324/339; 324/346; 166/250.16; 340/854.8
(58) Field of Search ................................ 324/323, 338, 324/339, 346; 166/250.01, 250.16, 66.5; 175/50; 340/854.5, 854.8

(56) References Cited

U.S. PATENT DOCUMENTS

| | | | |
|---|---|---|---|
| 3,079,549 A | * 2/1963 | Martin | ........................ 324/323 |
| 3,168,694 A | 2/1965 | Slattery | |
| 3,538,431 A | 11/1970 | Moss | |
| 3,548,299 A | 12/1970 | Duroux et al. | |
| 3,936,728 A | 2/1976 | Ghosh et al. | |
| 4,536,714 A | * 8/1985 | Clark | ........................ 324/338 |
| 4,609,873 A | 9/1986 | Cox et al. | |
| 4,748,415 A | 5/1988 | Vail, III | |
| 5,038,107 A | 8/1991 | Gianzero et al. | |
| 5,144,590 A | 9/1992 | Chon | |
| 5,233,304 A | 8/1993 | Hubans | |
| 5,293,128 A | 3/1994 | Zhou | |
| 5,426,367 A | 6/1995 | Martin et al. | |
| 5,467,823 A | 11/1995 | Babour et al. | |
| 5,563,512 A | * 10/1996 | Mumby | ...................... 324/339 |
| 5,646,533 A | 7/1997 | Locatelli et al. | |
| 5,654,639 A | 8/1997 | Locatelli et al. | |
| 5,740,125 A | 4/1998 | Chon et al. | |
| 6,009,043 A | 12/1999 | Chon et al. | |
| 6,175,536 B1 | 1/2001 | Khan | |
| 6,191,586 B1 | * 2/2001 | Bittar | ........................ 324/339 |
| 6,294,917 B1 | * 9/2001 | Nichols | ...................... 324/339 |

FOREIGN PATENT DOCUMENTS

| | | |
|---|---|---|
| GB | 2284062 | 5/1995 |
| GB | 2328024 | 2/1999 |
| WO | WO 98/00705 | 1/1989 |

OTHER PUBLICATIONS

Wilt et al., "Crosshole Electromagnetic Tomography: A New Technology for Oil Field Characterization," *The Leading Edge*, pp. 173–177 (Mar. 1995).

(List continued on next page.)

Primary Examiner—Gerard R. Strecker
(74) Attorney, Agent, or Firm—Kevin P. McEnaney; Brigitte L. Jeffery; John J. Ryberg (57) ABSTRACT

Systems and methods for determining characteristics of geologic formations between conductively lined wellbores. At least one transmitter is axially disposed at a selected depth in a first wellbore and is attached to an external surface of a conductive liner. At least one receiver is axially disposed at a selected depth in a second wellbore and is attached to an external surface of a conductive liner. Both the transmitter and the receiver are attached to a surface control station. The transmitter generates a first magnetic field, and a formation magnetic field induced by the first magnetic field is detected by the receiver. The detected formation magnetic field is used to determine characteristics of the geologic formations.

56 Claims, 7 Drawing Sheets

OTHER PUBLICATIONS

Wilt et al., "Crosswell Electromagnetic Tomography: System Design Considerations and Field Results," *Geophysics*, vol. 60, No. 3, pp. 871–885 (May–Jun. 1995).

Zhou et al., "Audio–Frequency Electromagnetic Tomography in 2–D," *Geophysics*, vol. 58, No. 4, pp. 482–495 (Apr. 1993).

Alumbaugh et al., "Theoretical and Practical Considerations for Crosswell Electromagnetic Tomography assuming a Cylindrical Geometry," *Geophysics*, vol. 60, No. 3, pp. 846–870 (May–Jun. 1995).

Augustin et al., "A Theoretical Study of Surface–to–Borehole Electromagnetic Logging in Case Holes," *Geophysics*, vol. 54, No. 1, pp. 90–99 (Jan. 1989).

Uchida et al., "Effect of a Steel Casing on Crosshole EM Measurement," SEG Annual Meeting, pp. 442–445 (Texas 1991).

Wu et al, "Influence of Steel Casings on Electromagnetic Signals," *Geophysics*, vol. 59, No. 3, pp. 378–390 (Mar. 1994).

Wilt et al., "Mapping Stream and Water Flow in Petroleum Reservoirs," *SPE 37532*, Int'l Thermal Operations & Heavy Oil Symposium (Feb. 10–12, 1997).

* cited by examiner

PERMANENTLY EMPLACED ELECTROMAGNETIC SYSTEM AND METHOD FOR MEASURING FORMATION RESISTIVITY ADJACENT TO AND BETWEEN WELLS

CROSS-REFERENCE TO RELATED APPLICATIONS

This application claims benefit of U.S. Provisional Application No. 60/200,856, filed May 1, 2000.

BACKGROUND OF INVENTION

1. Field of the Invention

The invention relates generally to subsurface characterization of geologic formations. More specifically, the invention relates to using sensors mounted outside wellbore casing in crosswell electromagnetic measurement techniques.

2. Background Art

Subsurface characterization of earth formations is an important aspect of drilling, for example, oil and gas wells. Subsurface characterization may help identify, among other factors, the structure and fluid content of geologic formations penetrated by a wellbore. The geologic formations surrounding the wellbore may contain, for example, hydrocarbon products that are the target of drilling operations. Knowledge of the formation characteristics is important to hydrocarbon recovery.

Geologic formations that form a hydrocarbon reservoir contain a network of interconnected fluid paths, or "pore spaces," in which, for example, hydrocarbons, water, etc., are present in liquid and/or gaseous form. To determine the hydrocarbon content in the pore spaces, knowledge of characteristics such as the porosity and permeability of the geologic formations penetrated by the wellbore is desirable.

Information about the geologic formations and about reservoir characteristics promotes efficient development and management of hydrocarbon resources. Reservoir characteristics include, among others, resistivity of the geologic formation containing hydrocarbons. The resistivity of geologic formations is generally related to porosity, permeability, and fluid content of the reservoir. Because hydrocarbons are generally electrically insulating and most formation water is electrically conductive, formation resistivity (or conductivity) measurements are a valuable tool in determining the hydrocarbon content of reservoirs. Moreover, formation resistivity measurements may be used to monitor changes in reservoir hydrocarbon content during production of hydrocarbons.

Formation resistivity measurements are often made with wireline conveyed measurement while drilling (MWD) and logging while drilling (LWD) tools. However, wireline MWD and LWD resistivity tools typically only measure formation resistivity proximate the individual wellbore in which they are operated. As a result, there have been several attempts to determine the resistivity of geologic formations surrounding and between adjacent wellbores drilled into the geologic formations of interest. For example, measurement of formation resistivity between adjacent wellbores using a low frequency electromagnetic system is discussed in two articles: *Crosshole electromagnetic tomography: A new technology for oil field characterization*, The Leading Edge, March 1995, by Wilt et al.; and *Crosshole electromagnetic tomography: System design considerations and field results*, Society of Exploration Geophysics, Vol. 60, No. 3, 1995, by Wilt et al.

Figure 1:
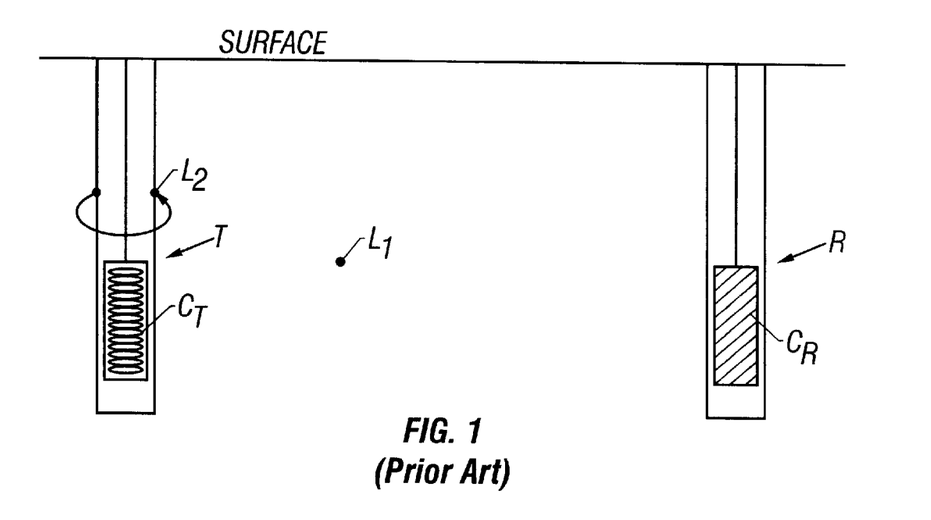
FIG. 1 shows a simplified view of a prior art crosswell electromagnetic measurement system.

FIG. 1 shows an example of a system used to measure formation resistivity between two wellbores. A transmitter T is located in one wellbore and consists of a coil $C_T$ having multi-turn horizontal loop (vertical solenoid) of $N_1$ turns and an effective cross section $A_T$. The multi-turn horizontal loop carries an alternating current $I_T$ at a frequency of $f_0$ Hz. In free space, the multi-turn horizontal loop produces a time varying magnetic field $B_0$. The magnetic field $B_0$ is proportional to a magnetic moment $M_T$ of the transmitter T and to a geometric factor $k_1$. The magnetic moment $M_T$ of the transmitter T can be defined as follows:

$$M_T = N_T I_T A_T. \tag{1}$$

In free space, the magnetic field $B_0$ can be defined as follows:

$$B_0 = k_1 M_T. \tag{2}$$

The geometric factor $k_1$ is a function of a spatial location and orientation of a component of the magnetic field $B_0$ measured by a receiver R.

The receiver R is located some distance from the transmitter T and is typically disposed in a different wellbore. The receiver R typically includes a loop of wire (e.g., a coil $C_R$ having $N_R$ turns wound about a core of high magnetic permeability metal such as ferrite). A time-varying magnetic field $B_R$ sensed by the receiver R, having a frequency $f_0$, creates an induced voltage $V_R$ in the coil $C_R$ which is proportional to $B_R$, the frequency $f_0$, the number of turns of wire $N_R$, an effective cross-sectional area of the coil $A_R$, and an effective magnetic permeability $\mu_R$ of the coil $C_R$. From the foregoing, $V_R$ can be defined as follows:

$$V_R = f_0 B_R N_R A_R \mu_R. \tag{3}$$

By simplifying equation (3), $V_R$ may be written as follows:

$$V_R = k_R B_R. \tag{4}$$

where $k_R = f_0 N_R A_R \mu_R$. The product of $A_R \mu_R$ is difficult to calculate. To accurately determine $A_R \mu_R$, $C_R$ is calibrated in a known magnetic field and at a known frequency to determine an exact value for $k_R$. Thereafter, the magnetic field $B_R$ sensed by the receiver R is related directly to the measured voltage $V_R$ by the following equation:

$$B_R = \frac{V_R}{k_R}. \tag{5}$$

When a system such as this is placed in a conductive geologic formation, the time varying magnetic field $B_0$ produces an electromotive force (emf) in the geologic formation which in turn drives a current therein, shown schematically as $L_1$ in FIG. 1. The current $L_1$ is proportional to the conductivity of the geologic formation and the flow of the current $L_1$ is generally concentric about the longitudinal axis of the wellbore. The magnetic field proximate the wellbore is a result of the free space field $B_0$, called the primary magnetic field, and the field produced by the current $L_1$ is called the secondary magnetic field.

The current $L_1$ is typically out of phase with respect to the transmitter current $I_T$. At very low frequencies, where the inductive reactance of the surrounding formation is small, the induced current $L_1$ is proportional to dB/dt and is, consequently, 90° out of phase with respect to $I_T$. As the frequency increases, the inductive reactance increases and the phase difference increases.

The secondary magnetic field detected by the receiver R is caused by the induced current $L_1$ and also has a phase shift so that the total magnetic field at the receiver R is complex in nature. The total magnetic field has a component $B_R$ in-phase with the transmitter current $I_T$ (referred to as the real component) and a component $B_1$ phase shifted by 90° (referred to as the imaginary or quadrature component). The values of the real $B_R$ and quadrature $B_1$ components of the magnetic field at a given frequency and geometric configuration uniquely specify the electrical resistivity of a homogenous formation penetrated by the wellbores. In a nonhomogeneous geologic formation, the complex magnetic field is generally measured at a succession of points along the longitudinal axis of the receiver wellbore for each of a succession of transmitter locations. The multiplicity of T-R locations suffices to determine the nonhomogeneous resistivity between the wellbores as described in the references listed below.

In general, nonhomogeneous distribution of electrical resistivity in a geologic formation is determined through a process called inversion, which is well described in *Audio-frequency electromagnetic tomography in 2-D*, Geophysics, Vol. 58, No. 4, 1993, by Zhou et al.; *Electromagnetic conductivity imaging with an iterative born inversion*, IEEE Transactions on Geoscience and Remote Sensing, Vol. 31, No. 4, 1993, by Alumbaugh et al.; *An approach to nonlinear inversion with applications to cross-well EM tomogaphy*, 63rd Annual International Meeting, Society of Exploration Geophysics, Expanded Abstracts, 1993, by Torres-Verdin et al.; and *Crosswell electromagnetic inversion using integral and differential equations*, Geophysics, Vol. 60, No. 3,. 1995, by Newman. The inversion process has been used to determine resistivity in the vicinity of a single wellbore or between spaced-apart wellbores wells and is described in detail in *Crosswell electromagnetic tomography: System design considerations and field results*, Geophysics, Vol. 60, No. 3, 1995, by Wilt et al.; *Theoretical and practical considerations for crosswell electromagnetic tomography assuming a cylindrical geometry*, Geophysics, Vol. 60, No. 3, by Alumbaugh and Wilt; and *3D EM imaging from a single borehole: a numerical feasibility study*, 1998, by Alumbaugh and Wilt.

One embodiment of the inversion process comprises assigning resistivities to a multitude of "cells" or elements of the space surrounding, or between, wellbores. The resistivities are systematically varied until the results from the cellular model of the formation most closely match observed data taken with the field transmitter receiver system described herein. In another embodiment, a more specific model of the formation is assumed using geological, well log, or other geophysical data. The parameters of this model (e.g., resistivity distribution, formation shape, layer thickness, etc.) are varied until the numerical results from the model most closely match the measured data. In another embodiment, direct images of the distribution of resistivity may be obtained following the principles of diffusion tomography as described in *Audio-frequency electromagnetic tomography in 2-D*, Geophysics, Vol. 58, No. 4, 1993, by Zhou et al. In yet another method, multifrequency electromagnetic data is transformed into a mathematically defined wave field domain and the data is processed following the procedures of seismic tomography. These means of interpreting the electromagnetic data are included here to illustrate the fact that electromagnetic methods are of practical use in determining the resistivity of geological formations.

Measurements of resistivity distribution between wellbores are usually made before and during extraction of hydrocarbons to detect hydrocarbon reservoirs and to monitor changes in reservoir resistivity as hydrocarbons are extracted. The system of FIG. 1 operates where the wellbore does not include conductive casing therein. Wellbores, however, typically include conductive liners or casing, typically steel, in order to preserve the physical integrity of the wellbore and the surrounding formations during hydrocarbon extraction and/or further drilling operations. Because typical casing is highly electrically conductive, magnetic fields intended to be introduced into the formation are strongly attenuated by the casing. Casing is very difficult (if not impossible) to remove from the wellbore once installed. As a result, the system shown above in FIG. 1 does not facilitate analysis of a hydrocarbon reservoir once conductive casing has been installed.

The problems presented by conductive casing in a wellbore of interest are described by Augustin et al. in *A Theoretical Study of Surface-To-Borehole Electromagnetic Logging in Cased Holes*, Geophysics Vol. 54, No. 1, 1989; Uchida et al. in *Effect of A Steel Casing on Crosshole EM Measurements*, SEG Annual Meeting, Texas, 1991; and Wu et al., in *Influence of Steel Casing on Electromagnetic Signals*, Geophysics, Vol. 59, No. 3, 1994. From these references, it may be observed that the casing conductivity may be modeled as an additional "shorted wire" closely coupled to the transmitter T, shown schematically as $L_2$ in FIG. 1.

A net or effective magnetic moment $M_{eff}$ of the transmitter/conductive casing combination is controlled by the inductive coupling therebetween. Physically, the resistivity of the conductive casing is very low while the inductance is relatively high. This results in an induced current in the conductive casing that is approximately 180° out of phase with the transmitter current $I_T$. The induced current is of opposite polarity with respect to the transmitter current $I_T$ but of almost the same moment. Therefore, the magnetic field external to the conductive casing is greatly reduced. In effect, the conductive liner "shields" the transmitter T from the receiver R positioned outside of the conductive casing. Any magnetic field outside the casing is produced by the difference in current, and hence moment, between the transmitter T and the conductive casing.

Because the induced moment in the casing is large and nearly equal to the transmitter moment, small changes in the properties of the casing produce large fractional changes in the effective moment. In practice, casing is known to be nonhomogenous (e.g., there are variations in casing diameter, thickness, permeability, and conductivity that may be caused by, for example, manufacturing/processing procedures or by corrosion/stress/temperature processes after installation in a wellbore). The central issue for the electromagnetic methods described above for non-cased, or open, wellbores is that the fields from the transmitter are severely attenuated in a cased well and that the net moment is highly variable as the transmitter traverses the length (e.g., the depth) of the well. Without precise knowledge of casing properties, it is difficult to distinguish between external field variations caused by the casing and variations produced by the formation.

A magnetic field sensor positioned within a cased wellbore experiences an analogous situation. The magnetic field to be detected induces current flowing concentrically with the receiver coil, and the induced current tends to reduce the magnetic field within the casing. The measurable magnetic field is consequently highly attenuated, and the measurement is highly influenced by the variations in attenuation caused by the variation in casing properties described above.

Often, the design criteria for a crosswell survey of a cased wellbore reduces the magnetic field signal to a level that is undetectable by standard receivers. Moreover, the variance in conductivity, permeability, and thickness along a longitudinal axis of a length of casing makes it difficult to determine an attenuation factor at any selected point. The inability to determine an attenuation factor at a selected point may cause errors in field measurements that are not easily corrected.

A prior attempt to overcome this limitation involves inclusion of a separate small-scale transmitter-receiver within the cased wellbore to measure the casing properties. The measured casing properties are then used to correct the measured crosswell data. See, e.g., Lee et al., *Electromagnetic Method For Analyzing The Property of Steel Casing, Lawrence Berkeley National Laboratories, Report* 41525, February, 1998.

Another prior attempt to correct for the magnetic field attenuation in a cased wellbore includes positioning a monitor receiver adjacent to the transmitter in the cased wellbore. In this manner, an attempt is made to predict the attenuation sensed by, for example, a receiver located in an adjacent wellbore. This method is disclosed in U.S. patent application Ser. No. 09/290,156, filed Apr. 12, 1999, entitled Method and Apparatus for Measuring Characteristics of Geologic Formations, and assigned to the assignee of the present invention.

In U.S. patent application Ser. No. 09/394,852, filed Sep. 13, 1999, entitled An Electromagnetic Induction Method and Apparatus For The Measurement of the Electrical Resistivity of Geologic Formations Surrounding Boreholes Cased with A conductive Liner, and assigned to the present assignee, a method for measuring formation resistivity adjacent to and between cased wellbores using low frequency (<200 Hz) multiturn solenoidal coils within cased wellbores is disclosed. Specifically, the method disclosed therein allows measurement of the resistivity of geologic formations proximate a wellbore encased with a conductive, or metallic, casing made from materials such as steel. The method includes taking appropriate ratios of measured fields either inside or outside of the metallic casing so that attenuation due to the casing is practically canceled.

Measurements with the aforementioned method are difficult to perform once production from the well has begun and production tubing has been run from the surface to the producing zone. The production tubing leaves little or no room for the electromagnetic measurement system to move in the well. Repeated measurements to monitor production or enhanced recovery processes as a result require repeated removal and reinsertion of the production tubing. This is a costly operation, and it is clear that a permanent monitoring system, on the outside of the casing, would be more cost effective.

What is needed, therefore, is a cross-well measurement technique that provides accurate resistivity measurements of geologic formations without requiring detailed information concerning the electrical and magnetic properties of a liner disposed in the wells, and that does not reduce production efficiency of the wells.

SUMMARY OF INVENTION

In one aspect, the invention comprises a method for determining characteristics of geologic formations between wellbores. The method comprises activating at least one transmitter to generate a first magnetic field, the at least one transmitter disposed about an external surface of a conductive liner at a selected depth in a first wellbore. A formation magnetic field induced by the first magnetic field is detected with at least one receiver disposed about an external surface of a conductive liner at a selected depth in a second wellbore. A characteristic of the geologic formation is determined from the detected formation magnetic field.

In another aspect, the invention comprises a method for determining characteristics of geologic formations between wellbores. The method comprises activating a first of a plurality of axially spaced transmitters to generate a first magnetic field, the plurality of transmitters disposed about an external surface of a conductive liner at selected depths in a first wellbore. A first formation magnetic field induced by the first magnetic field is detected with a first of a plurality of axially spaced receivers, the plurality of receivers disposed about an external surface of a conductive liner at selected depths in a second wellbore. The first formation magnetic field induced by the first magnetic field is then detected with a second of the plurality of receivers. A first amplitude ratio is calculated from the first formation magnetic fields detected by the first and second of the plurality of receivers.

The method further comprises activating a second of the plurality of transmitters to generate a second magnetic field. A second formation magnetic field induced by the second magnetic field is detected with the first of the plurality of receivers. The second formation magnetic field induced by the second magnetic field is then detected with the second of the plurality of receivers. A second amplitude ratio is calculated from the second formation magnetic fields detected by the first and second of the plurality of receivers. A third amplitude ratio is then calculated from the first amplitude ratio and the second amplitude ratio, and a characteristic of the geologic formation is determined from the third amplitude ratio.

In another aspect, the invention comprises a method for determining characteristics of geologic formations between wellbores. The method comprises activating a first transmitter at a first selected depth to generate a first magnetic field, the first transmitter disposed on a drilling tool disposed at a selected depth in a first wellbore. A first formation magnetic field induced by the first magnetic field is detected with a first of a plurality of axially spaced receivers, the plurality of receivers disposed about an external surface of a conductive liner at selected depths in a second wellbore. The first formation magnetic field induced by the first magnetic field is detected with a second of the plurality of receivers. A first amplitude ratio is calculated from the first formation magnetic fields detected by the first and second of the plurality of receivers.

In another aspect, the invention comprises a method for telemetering data between wellbores. The method comprises activating a first transmitter to generate a first magnetic field, the first transmitter disposed on a drilling tool disposed in a first wellbore. A formation magnetic field induced by the first magnetic field is detected with at least one receiver, the at least one receiver disposed about an external surface of a conductive liner at a selected depth in a second wellbore. A drilling tool characteristic is determined from the detected formation magnetic field.

In another aspect, the invention comprises a system for determining characteristics of geologic formations between conductively lined wellbores. The system comprises at least two axially spaced apart electromagnetic transmitters positioned at selected depths in a first wellbore and disposed about an external surface of a conductive lining. At least two axially spaced apart electromagnetic receivers are positioned at selected depths in a second wellbore and disposed about an external surface of a conductive lining. At least one surface control station is operatively coupled to the at least two transmitters and the at least two receivers, and the at least one surface control station is adapted to selectively activate each of the at least two electromagnetic transmitters to generate first magnetic fields and to selectively activate each of the at least two electromagnetic receivers to detect formation magnetic fields induced by the first magnetic fields.

In another aspect, the invention comprises a system for determining characteristics of geologic formations between conductively lined wellbores. The system comprises a plurality of axially spaced electromagnetic transmitters disposed about an external surface of a conductive liner at selected depths in a first wellbore, and the plurality of electromagnetic transmitters are adapted to generate first magnetic fields. A plurality of axially spaced electromagnetic receivers are disposed about an external surface of a conductive liner at selected depths in a second wellbore, and the plurality of electromagnetic receivers are adapted to detect formation magnetic fields induced by the first magnetic fields. The system also comprises means for calculating an amplitude ratio from the detected formation magnetic fields, and means for determining a characteristic of the geologic formation from the amplitude ratio.

In another aspect, the invention comprises a system for determining characteristics of geologic formations proximate a conductively lined wellbore. The system comprises a plurality of axially spaced electromagnetic transmitters disposed about an external surface of a conductive liner at selected depths in a wellbore, and the plurality of electromagnetic transmitters are adapted to generate first magnetic fields. A plurality of axially spaced electromagnetic receivers are disposed about an external surface of a conductive liner at selected depths in the wellbore, and the plurality of electromagnetic receivers adapted to detect formation magnetic fields induced by the first magnetic fields. The system also comprises means for calculating an amplitude ratio from the detected formation magnetic fields, and means for determining a characteristic of the geologic formation from the amplitude ratio.

Other aspects and advantages of the invention will be apparent from the following description and the appended claims.

DETAILED DESCRIPTION

Figure 2:
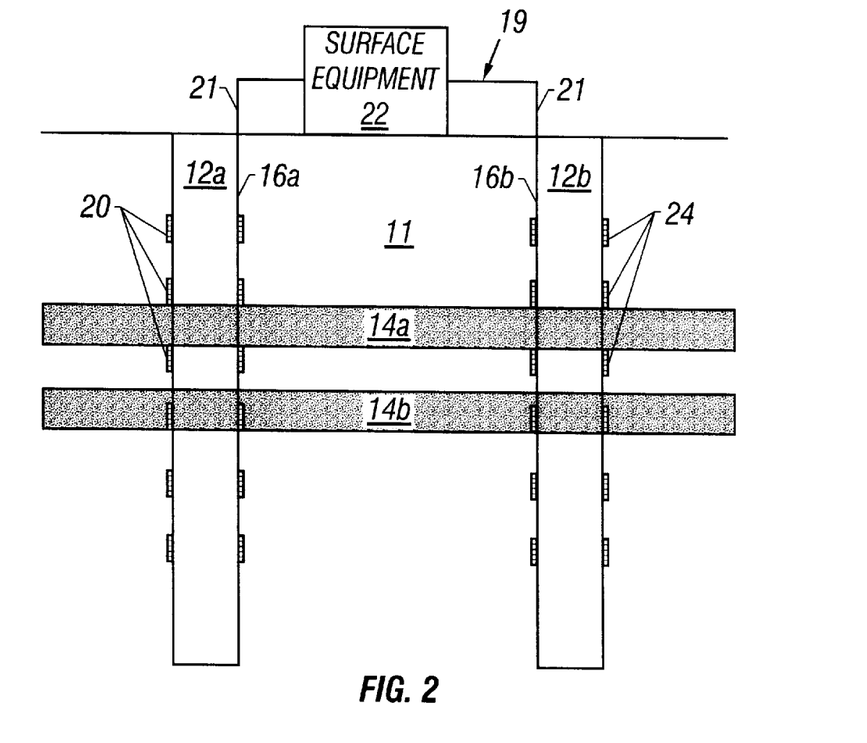
FIG. 2 shows a view of a crosswell embodiment of the invention.

Referring to FIG. 2, a geologic formation 11 under analysis may be penetrated by one or more wellbores, shown generally as 12a and 12b. The geologic formation 11 may further comprise other geologic structures, such as one or more reservoirs containing hydrocarbons, shown generally as 14a and 14b. Typically, at least one of the wellbores 12a, 12b includes a conductive liner (16a and 16b, respectively) therein.

FIG. 2 shows a system 19 used to analyze the geologic formation 11 including a plurality of axially spaced transmitters 20 attached to an outside surface of the conductive liner 16a that is disposed within wellbore 12a in a first region of the geologic formation 11. A signal generator (not shown) is communicatively linked with the plurality of transmitters 20. The signal generator (not shown) is generally included in a surface station 22. A plurality of receivers 24 are attached to an outside surface of the liner 16b that is disposed within wellbore 12b in a second region of the geologic formation 11.

The system 19 may be operated using a computer (not shown) that is generally included in the surface station 22. The computer (not shown) is communicatively linked with the transmitters 20 and receivers 24 using cables 21 disposed on the exterior surfaces of the casing 16a, 16b associated therewith. The computer (not shown) includes a processor (not shown) and memory (not shown) that stores programs to operate the system 19.

Typically, magnetic fields are generated by the plurality of transmitters 20 located at various levels above, within, and below an area of interest in the geologic formation 11. Magnetic fields are sensed by the plurality of receivers 24 at various levels above, within, and below the area of interest. In an embodiment of the invention, the plurality of transmitters 20 and the plurality of receivers 24 are disposed externally about the casings 16a, 16b at selected axial intervals. The axial positions, at which the plurality of transmitters 20 and the plurality of receivers 24 are selected, are located at fixed, preselected depths once casings 16a, 16b are positioned within wellbores 12a, 12b.

An important aspect of the invention is that the casing itself acts as a magnetically permeable core for either the transmitters or the receivers. At the operating frequencies preferred for use with various embodiments of the invention, magnetic field enhancement due to the casing magnetic permeability helps offset the magnetic field attenuation caused by the flow of induced currents in the casing. The magnetic field enhancement results in a net gain in strength of magnetic fields formed outside the casing over that which would be obtained if the transmitters/receivers were wound on a non-magnetic, non-conductive core. The length of the casing ensures that the relative magnetic permeability $\kappa_{m\text{-}relative}$ of the core material (upon which a solenoid is wound and corresponding to a cross section of the casing) will be close to the true magnetic permeability $\kappa_m$ which, for typical casing, lies between 50 and 200.

The limit on the net magnetic moment M, where $$M = NIA \qquad (6)$$

for a transmitter consisting of a solenoid wound on the casing is the counter moment caused by the current induced in the casing. The counter moment can be reduced in some embodiments by cutting thin axial slots (one may be sufficient) in the casing to interrupt the induced current flow. This is equivalent to the use of thin insulated strips used in the core material of typical solenoids. Slotted casing is already used in oil field applications to allow ingress of formation fluids at levels of interest. Such a transmitter or receiver could consequently be wound on essentially standard casing.

The moments achievable with such a transmitter (and/or the sensitivities achievable in a receiver solenoid wound on casing in a similar manner) are comparable to or larger than the effective moments achieved with solenoids wound on high permeability material located within the casing. This is due to the greater radius and length that is conveniently available when using casing as the core of the transmitter/receiver.

However, slotting the casing does not cancel all of the circulating counter current induced in the casing in the vicinity of the windings. While a slot of the same length as the winding interrupts the current within the length of casing under the winding, the induced currents are forced to circulate in the casing proximate the ends of the winding. In this region, the induced currents depend on the geometric "fall off" of the current inducing solenoid field and on the flux gathering effect of the casing permeability (which is not affected by the slot). Ideally, it is desirable to introduce a magnetically insulating gap (a cylindrical segment of zero relative permeability) at each end of the winding to reduce the magnetic flux resulting from the continuous nature of the adjacent casing.

U.S. patent application Ser. No. 09/394,852, now U.S. Pat. No. 6,294,917, assigned to the present assignee and incorporated herein by reference, discloses a method for determining formation properties between cased wellbores. Referring again to FIG. 2, where wellbores 12a, 12b are lined with conductive casing 16a, 16b, a ratio of magnetic fields detected by the receivers 24 can be used to exclude casing effects and to determine properties of the geologic formation 11 between the wellbores 12a, 12b.

For each ratio, two transmitters 20 are activated individually and two receivers 24 detect secondary magnetic fields induced by the primary magnetic fields generated by the transmitters 20. Therefore, transmitters 20 positioned at different axial positions in the wellbore 12a produce the secondary magnetic fields detected by the receivers 24 at different positions in the wellbore 12b. To determine formation characteristics, a "double ratio" is performed in the following manner. Note that the following description is intended to illustrate the ratio method and is not intended to limit the scope of the invention.

Figure 3:
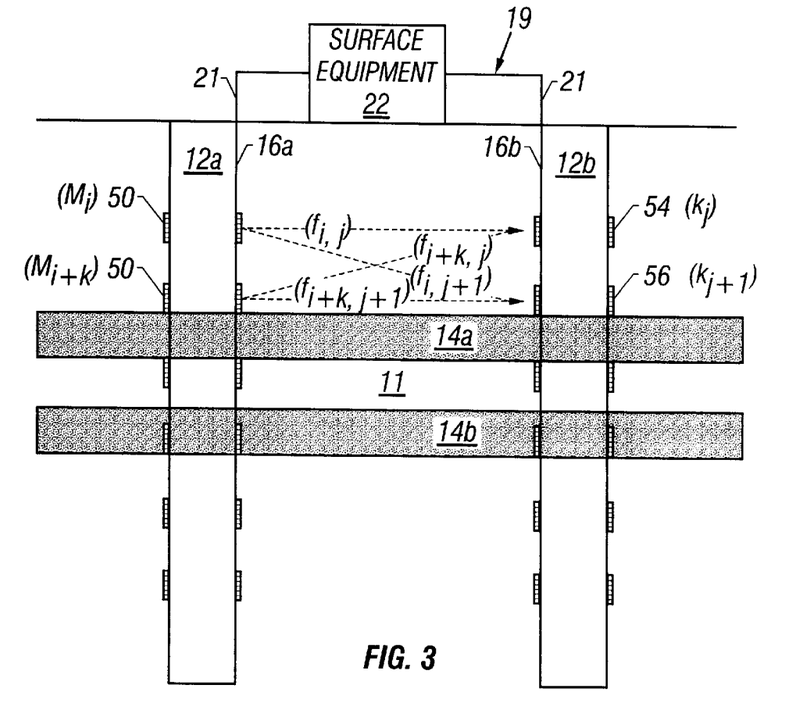
FIG. 3 shows another view of a crosswell embodiment of the invention.

Referring to FIG. 3, a first transmitter 50 and a second transmitter 52 are positioned in wellbore 12a. A first receiver 54 and a second receiver 56 are positioned in wellbore 12b. Accordingly, two magnetic fields detected by the first receiver 54 resulting from each of the two transmitters 50, 52 may be described as follows:

$$B_{i,j} = M_i f_{i,j} k_j \text{ and} \quad (7)$$

$$B_{i+k,j} = M_{i+k} f_{i+k,j} k_j \quad (8)$$

where $M_i$ and $M_{i+k}$ are magnetic moments of the transmitters 50, 52, respectively, at two different axial positions in wellbore 12a (note that, to some extent, the moments differ because of, for example, inconsistencies in casing diameter, casing thickness, etc.). Formation responses, $f_{i,j}$ and $f_{i+kj}$, correspond to a common position of the first receiver 54 and the different axial positions of the transmitters 50, 52. The variable $k_j$ is a casing attenuation factor corresponding to the location of the first receiver 54.

Similarly, the two magnetic fields detected by the second receiver 56 from each transmitter 50, 52 may be described as follows:

$$B_{i,j+1} = M_i f_{i,j+1} k_{j+1} \text{ and} \quad (9)$$

$$B_{i+k,j+1} = M_{1+k} f_{i+k,j+1} k_{j+1} \quad (10)$$

where the magnetic moments ($M_i$, $M_{i+k}$), formation responses ($f_{i,j+1}$, $f_{i+kj+1}$), and the casing attenuation factor ($k_{j+1}$) are defined in a manner similar to that shown above.

To abrogate the effects of differences in the magnetic moment of each of the transmitters 50, 52, the following ratios are defined:

$$r_1 = \frac{B_{i,j}}{B_{i,j+1}} = \frac{f_{i,j}}{f_{i,j+1}} \cdot \frac{k_j}{k_{j+1}} \text{ and} \quad (11)$$

$$r_2 = \frac{B_{i+k,j}}{B_{i+k,j+1}} = \frac{f_{i+k,j}}{f_{i+k,j+1}} \cdot \frac{k_j}{k_{j+1}}. \quad (12)$$

To abrogate the effects of the casing attenuation factors, a ratio of $r_1$ and $r_2$ determines that:

$$\frac{r_1}{r_2} = \frac{f_{i,j}}{f_{i,j+1}} \cdot \frac{f_{i+k,j+1}}{f_{i+k,j}}. \quad (13)$$

From the foregoing ratios, the formation response "f" (which may be related to, for example, a resistivity of the geologic formation 11) may be determined while minimizing the effects of the casing 16a and 16b.

Figure 4:
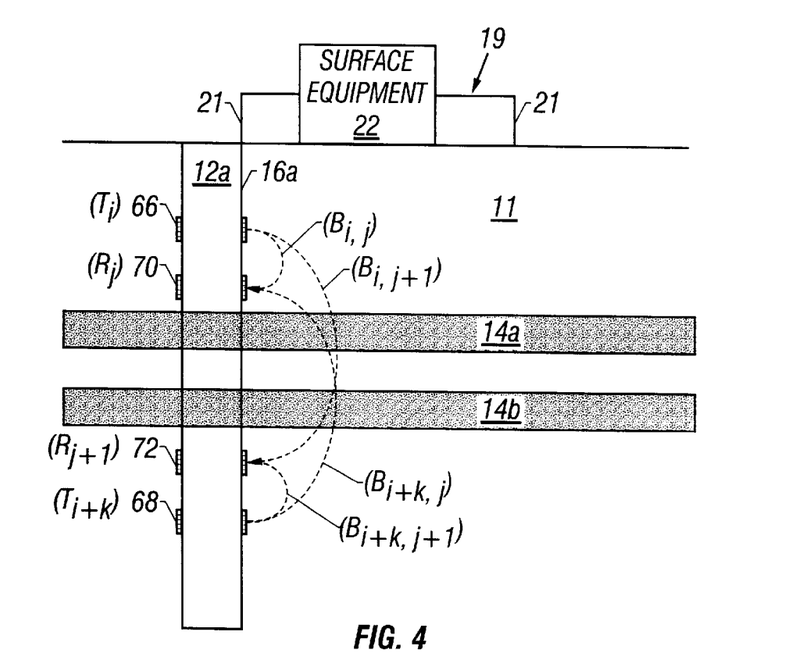
FIG. 4 shows a view of a single well embodiment of the invention.

The ratio method may also be used to determine characteristics of a geologic formation 11 using a single wellbore 12a with a conductive casing 16a, as shown in FIG. 4. In the embodiment shown in FIG. 4, a pair of transmitters 66, 68 and a pair of receivers 70, 72 are disposed at different axial positions in the wellbore 12a. The receivers 70, 72 are positioned between the two transmitters 66, 68. In this manner, a magnetic field $B_{i,j}$ detected by receiver 70 at a position $R_j$ from the transmitter 66 (which is positioned at location $T_j$) may be defined as:

$$B_{i,j} = M_i f_{i,j} k_j. \quad (14)$$

A magnetic field $B_{i,j+1}$ detected by the receiver 72 (at a position $R_{j+1}$) from the transmitter 66 may be defined as:

$$B_{i,j+1} = M_i f_{i,j+1} k_{j+1}. \quad (15)$$

From these two magnetic fields, a ratio may be defined as:

$$R_1 = \frac{B_{i,j}}{B_{i,j+1}} = \frac{f_{i,j} k_j}{f_{i,j+1} k_{j+1}}, \quad (16)$$

which is independent of the magnetic moment of the transmitter 66 but still depends upon the casing attenuation factors at the receivers 70, 72. However, the second transmitter 68 (located at position $T_{i+k}$) may be used to derive a new ratio of the magnetic fields detected by the sensors 70, 72 that may be expressed as follows:

$$R_2 = \frac{B_{i+k,j}}{B_{i+k,j+1}} = \frac{f_{i+k,j} k_j}{f_{1+k,j+1} k_{j+1}}. \quad (17)$$

Ratio $R_2$ is independent of the magnetic moment of the transmitter 68 but still depends upon the casing attenuation factors in a manner similar to the ratio $R_1$. Accordingly, as in the discussion of the previous embodiment, a second ratio may be formed using $R_1$ and $R_2$ to eliminate the effect of the casing attenuation factors:

$$\frac{R_1}{R_2} = \frac{f_{i,j}}{f_{i,j+1}} \cdot \frac{f_{i+k,j+1}}{f_{i+k,j}}. \tag{18}$$

It has been determined that for frequencies useful for single well or crosswell conductivity imaging on the reservoir scale (10's to 100's of meters), a solenoid wound directly on standard casing with a single slot extending approximately one meter beyond the axial end of the coil winding (e.g., beyond each end of the winding) produces a more than adequate moment for a permanent monitoring system. Furthermore, it has been determined that such slots permit the use of frequencies as high as 10,000 Hz with only modest attenuation. This determination permits the use of "standard" high-resolution induction logging in the presence of casing.

Figure 5:
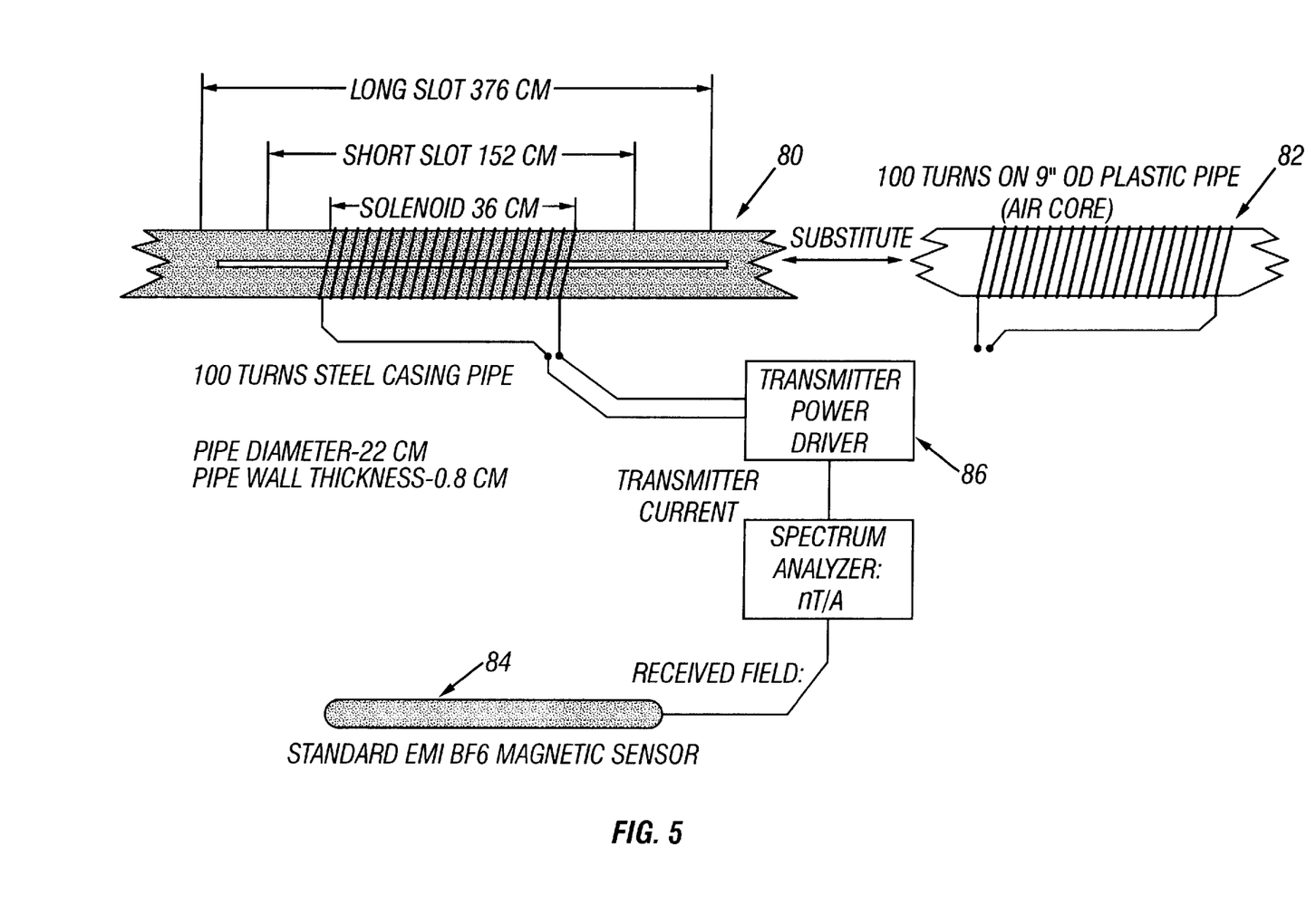
FIG. 5 shows a view of an experimental system used to generate the data for the plots shown in FIG. 6.

Experimental data were obtained by examining the fields produced by a solenoid on a typical steel casing, as shown in FIG. 5. The solenoid consisted of 100 turns wound on either the steel casing 80 or on a plastic pipe 82 of the same radius. Fields were measured with a standard magnetic field sensor 84, such as a sensor manufactured by Electromagnetic Instruments Inc. (model BF-6), and the frequency of the current in the solenoid was varied from 1.0 Hz to 10,000 Hz with a controllable transmitter 86. The current itself was measured at each frequency, and the measured field was normalized with respect to the measured current.

Figure 6:
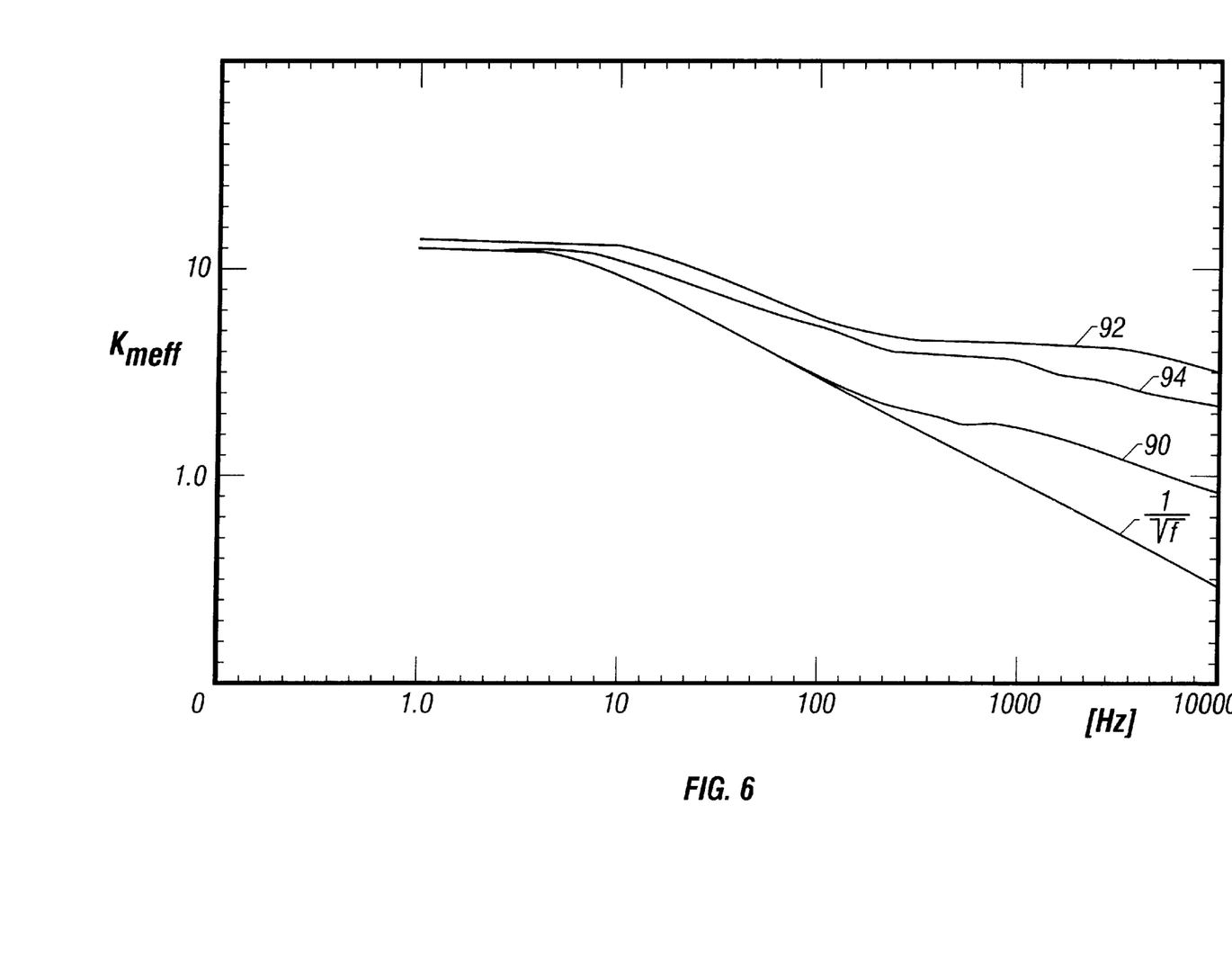
FIG. 6 shows a graphical representation of data obtained from the experimental system shown in FIG. 5.
Figure 7A:
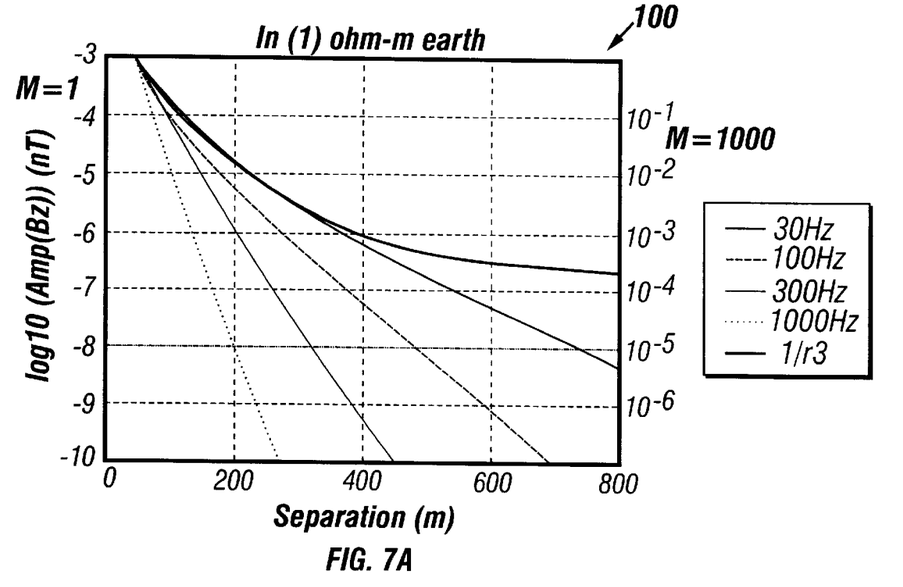
FIGS. 7a–7d show graphical representations of data obtained from the experimental system shown in FIG. 5.
Figure 7B:
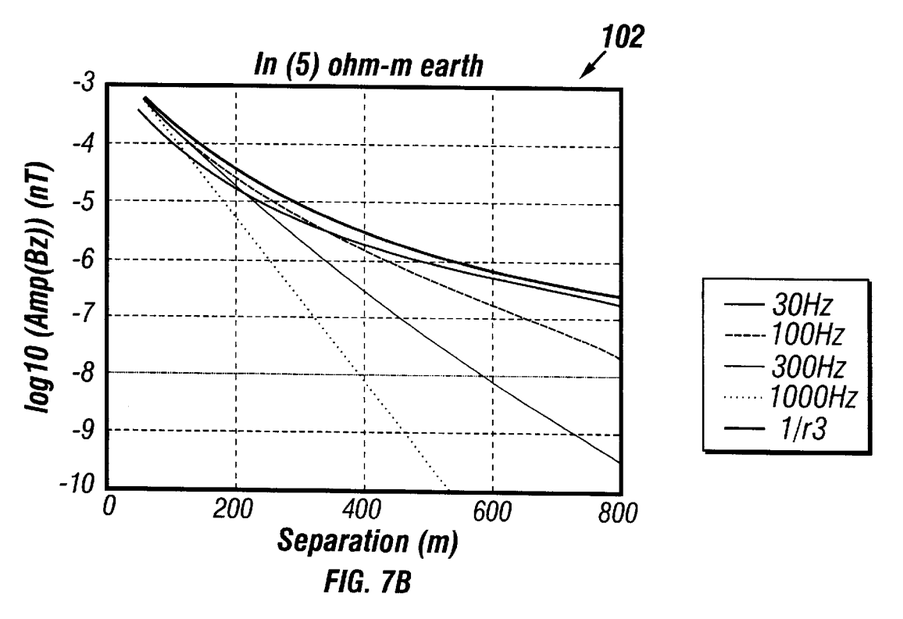
Figure 7C:
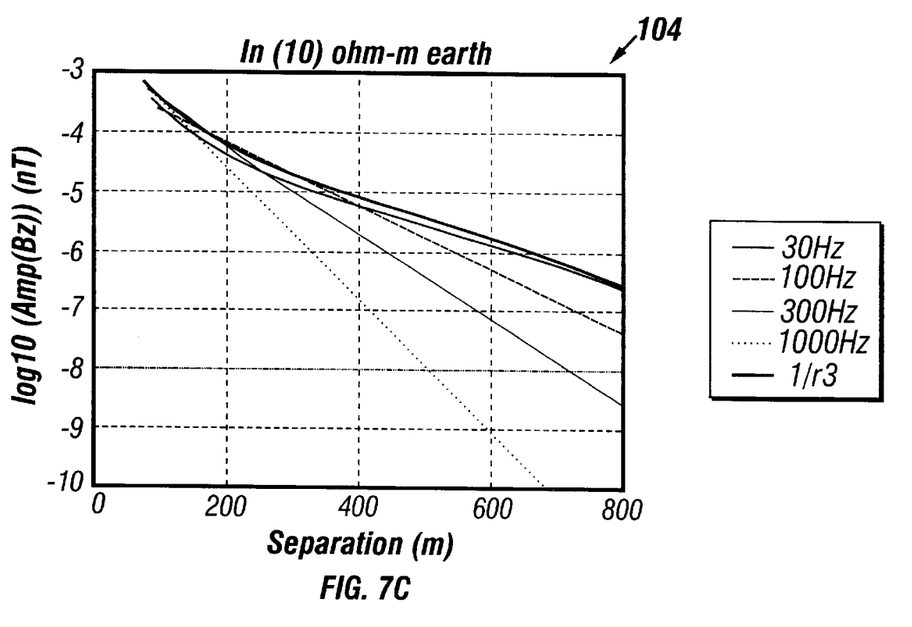
Figure 7D:
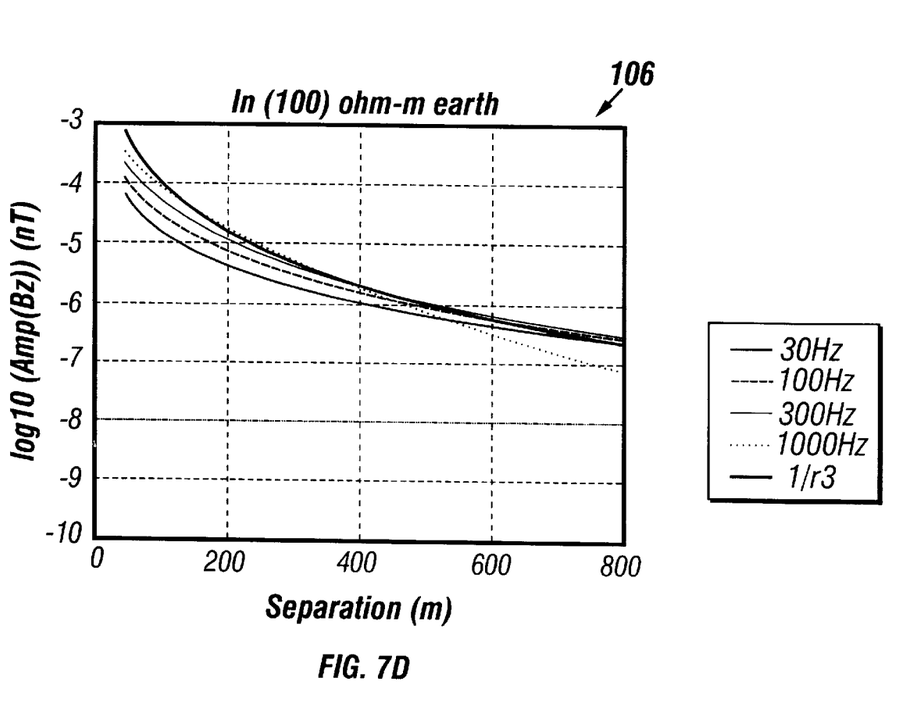

The results are shown in FIG. 6 as the ratio of the field measured with the casing core to the field measured with the plastic pipe core, which provides a direct experimental determination of the effective permeability of the casing core. The field magnetization enhancement of the casing core causes an effective increase in the moment at DC. The induced currents cause a decrease in moment as the frequency increases. The enhancement of the field due to the magnetization of the casing is evident for frequencies below about 1000 Hz.

The measurements were made with two slot lengths. A first, indicated by "short slot" 94, extended about 2 casing diameters past the end of the winding and a second, "long slot" 92, extended about 7 casing diameters past the end of the winding. The attenuation for the unslotted 90 casing falls off below a few hundred Hz as predicted by induction theory. Above a few hundred Hz, the current is confined to the outer section of the casing by skin depth effects and the magnitude of the counter current is reduced. The slots 92, 94 clearly interrupt the induction current attenuation essentially independent of slot length up to about 300 Hz, above which the long slot 92 is more effective than the short slot 94. At the maximum frequency of interest for reservoir imaging, approximately 500 Hz, the field is only attenuated by at most a factor of 3.5 for the short slot 94 as compared to a factor of 10 for the unslotted 90 casing.

It should be noted that the attenuation factors increase very little for the long slot 92 as the frequency increases to 10,000 Hz (10 kHz), whereas the field for the unslotted 90 casing has been attenuated by a factor of almost 50 at this frequency. This implies that formation resistivity monitoring may be performed with casing wound solenoids at the same resolution as is achieved with open hole induction logging.

The strength of the magnetic field is proportional to the moment M of the transmitter, which is given by $$M = \kappa_m \mu_0 N I A \tag{19}$$

where $\mu_0$ is the magnetic permeability of free space, $\kappa_m$ is the relative permeability, A is the cross sectional area of the solenoid, I is the current, and N is the number of turns of wire used in the solenoid. In free space at a distance r away in a direction perpendicular to the axis of the solenoid, the magnetic field produced $B_{0z}$ (Tesla, T) is given by $$B_{0z} = \left(\frac{\mu_0}{4\pi}\right)\left(\frac{\pi a^2 I N}{r^3}\right) \tag{20}$$

where a is the radius of the solenoid.

In practical units of nanoTeslas (nT, $10^{-9}$ T), the field at a distance r away is $$B_{0z} = \frac{100 N I A}{r^3}. \tag{21}$$

As the transmitter current varies sinusoidally with a frequency of f Hz, the associated changing magnetic fields induce currents in the conductive formation and in any nearby conductors such as the drillstring or casing. These currents dissipate energy, and the magnetic fields are attenuated over and above the DC attenuation. Fundamentally, then, the overall attenuation must always increase as the frequency of the transmitter increases.

The amplitude of the magnetic fields produced within the formation, including along the wellbore, at points distant from the transmitter can be calculated as a function of the formation resistivity and frequency. Anticipating that compromises may be required between frequency and range, responses have been calculated for several frequencies between 30 Hz and 1000 Hz. These response plots are presented in FIGS. 7a–7d.

The field strength in nT is for a unit moment in the transmitter. Using the plots shown in FIGS. 7a–7d, it is a straightforward exercise to develop a general design of a realizable system. The analysis below is for one typical embodiment and is not intended to limit the scope of the invention. The analysis is intended to clarify the concepts presented herein and to provide an example of practical applications of the invention. The system design for the maximum range for frequencies of interest now depends on the maximum sensitivity achievable in the receivers and the maximum practical moment in the transmitter. We consider the receiver first.

The receiver, in accordance with the present embodiment, includes a multiturn solenoid wound around the casing. Enhancement of the received field due to magnetization and attenuation of the field due to the induction currents formed affect the receiver in a manner similar to the transmitter. The receiver essentially acts as a solenoid with an effective magnetic permeability as shown in FIG. 5. From Faraday's Law, the voltage across the terminals of the solenoid in an axial field of B Teslas can be determined by the expression:

$$V = \frac{N \kappa_m A \delta B}{\delta t} = \kappa_m 2\pi f N A B \tag{22}$$

where A represents the cross sectional area of the solenoid and N represents the number of turns of wire in the solenoid.

For this embodiment, a casing of 10 cm radius was selected so that $A = \pi \cdot 10^{-2}$ m$^2$. The frequency selected was 100 Hz, which is representative of frequencies used in cross wellbore imaging. With $\kappa_m$ of about 6.4, as shown in FIG. 5, and with the selected values of A and f, the voltage can be calculated as follows:

$$V = \kappa_m 2\pi f N \pi \cdot 10^{-2} B. \tag{23}$$

This design is similar to that used in conventional high sensitivity multi-turn coil receivers comprising mu-metal cores and feedback windings to stabilize the response as known in the art. In these systems, the core is formed of high magnetic permeability metal in the form of insulated strips to optimize the magnetization properties of the core while preventing the flow of induction image currents. Practical experience with the receivers shows that the minimum detectable voltage is about 10 nV ($10^{-8}$ V). From equation (23), the minimum detectable field can be calculated as follows:

$$B = \frac{10^{-2}}{\kappa_m 2\pi f N \pi \cdot 10^{-2}} \approx \frac{5 \times 10^{-8}}{\kappa_m f N}. \tag{24}$$

Again, from practical experience, it is known that up to tens of thousands of turns of wire can be used, apparently yielding very low equivalent fields. For example, with 10,000 turns, a frequency of 100 Hz, and a $\kappa_m$ of 6.4, as shown in FIG. 6, the magnetic field sensitivity would be $0.78 \times 10^{-4}$ T.

Because the current in the transmitter solenoid dissipates power, an optimum transmitter would achieve the highest moment with the minimum power. As an example of a practical design, we assumed a single layer of windings on a 1 m length of casing (again of 10 cm radius). Once the number of turns is selected, the wire diameter and its total resistance (R) and inductance (L) is fixed. The inductance of the solenoid is important because the voltage needed to drive the desired current depends on the product f·L and, as a practical matter, it is also desirable to keep this drive voltage low.

Figure 8:
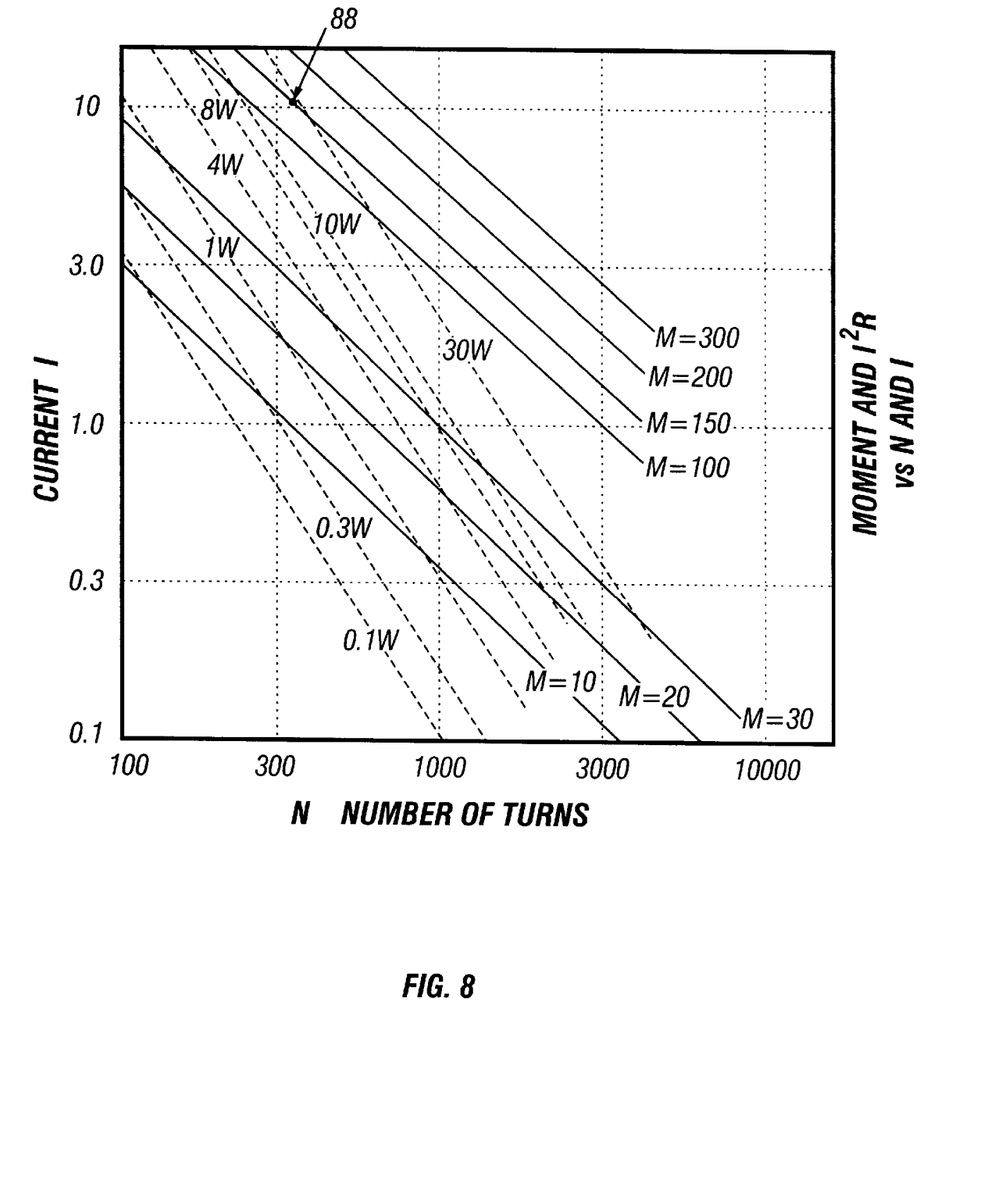
FIG. 8 shows a graphical representation of data for solenoid responses obtained from an experimental system such as that shown in FIG. 5.

A summary of the design information for such a transmitter is contained in the plots of FIG. 8. In FIG. 8, the coordinate axes are the number of turns of wire (N) and the current in the solenoid (I), along with the resulting moment (M) and power dissipation (required from the power supply). It is evident that the optimum transmitter consists of the smallest number of turns with the largest wire (e.g., the larger wire capable of carrying a higher current). It is also evident from data point 88 that a moment of 150 is quite feasible with a little over 300 turns, 12 Amperes, and a power dissipation of only 30 Watts. Such a transmitter would have an operating voltage of 50 volts at a frequency of 100 Hz. These results were obtained for an air core coil. If the coil were wound on the casing, the moment would be increased by $\kappa_m$ (e.g., by a factor of 6.4 at 100 Hz), yielding a moment of about 1000.

The embodiment described above is intended to be illustrative and non-limiting. Further optimization could be achieved with the following changes to the basic design (all of which are possible embodiments of this invention. For example, the solenoid could be longer with a correspondingly higher moment and sensitivity. In a practical system, the current may be limited by the power supply. In this case, the number of turns of wire on the transmitter can be increased by winding more layers of turns. Further increasing wire size (e.g., the wire diameter) with more turns can keep the power dissipation the same while increasing the moment.

For the purpose of this embodiment, it can be assumed that a moment of 1000 can readily be achieved at 100 Hz. Increasing the frequency to 500 Hz decreases the moment by only 25% while increasing the operating voltage to only 250 volts. It is clear that much higher frequencies may be used with externally wound solenoids than with prior art solenoids mounted within the casing. Although the latter have moments as high as 1000, the magnetic field is effectively reduced to zero by 500 Hz (due to, for example, casing effects).

It is, of course, important to provide a signal that is well above the sensitivity or noise level of the receiver. In the discussion of the receiver above it was determined that a conservative detection threshold is about $10^{-5}$ T. If it is desired to make a measurement accurate to within 1.0%, a magnetic field with a strength of at least $10^{-3}$ T must be provided, or the signal may averaged over a long enough time to reduce the receiver noise by a factor of 100.

This leads to another advantage of having the transmitters/receivers wound on the casing and permanently deployed: there is no practical limit on the time that the signals can be averaged. In all of the prior art cased hole and open (uncased) hole applications of electromagnetic induction technology, the transmitters and receivers are typically moved along the axis of the wellbore in a relatively short time because production has been interrupted to conduct the survey or, in new wells, there is urgency in completing the survey so as to install casing or proceed with drilling operations as quickly as possible. At 100 Hz, existing wellbore system measurements average a signal for about one second. In the permanently mounted systems, signal averaging could be extended to, for example, 10,000 seconds (e.g., about 3 hours) with a corresponding increase of 100 in the signal to noise ratio. This essentially means that the desired signal level can be averaged for a long enough time to achieve the intrinsic sensitivity of the receiver, namely $10^{-5}$ T.

The range of the system can now be determined from FIGS. 7a–7d by simply drawing a horizontal line on each plot at a field strength of $10^{-5}$ T after multiplying the amplitude scale by the moment, in this case 1000. This is equivalent to drawing the line on the plots for a moment of one at an amplitude of $10^{-8}$ T. The increase in range compared to the placement of the transmitters and receivers inside the casing is significant, especially at frequencies above 100 Hz. For the most conductive formation, 1 ohm-m (100 in FIG. 7a), a range at 100 Hz is almost 500 m. At 5 ohm-m (102 in FIG. 7b), the range has increased to 800 m. More importantly, for the inversion process where the use of a spectrum of frequencies improves the resolution, much higher frequencies can be used. For example, in a typical sandstone reservoir of 10 ohm-m (104 in FIG. 7c) resistivity, the range is 500 m or above for all frequencies up to 1000 Hz.

The design diagrams of FIGS. 7a–7d show many other possible variants of crosswell and single well resistivity mapping systems in cased wellbores that have not heretofore been possible or described. For example, in high resistivity formations, such as carbonates (e.g., limestone, etc., with, for example, a resistivity of 100 ohm-m (106 in FIG. 7d)), excellent resolution of small scale features such as fracture zones can be achieved by using frequencies as high as 10,000 Hz. Note that as the resistivity increases, the formation attenuation decreases and lower moments may be used. This reduces the voltage required on the transmitter to practical levels.

In single wells, arrays of transmitters and receivers spaced as closely as one meter, using solenoids of small length and very small moment, can be used in configurations similar to those used now in conventional deep induction logging. The radius of investigation of these systems could range from a few meters to as much as 50–100 m, depending on the formation resistivity.

In a multiwell field, the permanently mounted solenoid receivers could detect signals from a transmitter placed near the drill bit in a new well in the field. This arrangement would serve two important purposes. First, it could be used to monitor the formation resistivity in the formation being drilled as the drilling proceeds (effectively forming a logging while drilling (LWD) system). Second, it could be used to telemeter data about the conditions of the drill bit itself or auxiliary logging data proximate the drill bit to the surface via the nearby well. The bandwidth for such a telemetry system is much higher than any system now used to send information from the drill bit to the surface. Details for a transmitter attached to the drill string behind the drill bit and for the bandwidth of the telemetry may be found in U.S. patent application Ser. No. 09/394,852, assigned to the present assignee, and incorporated herein by reference.

For practical implementation of the invention, one embodiment may have a relatively simple cable configuration service any number of transmitters or receivers via the use of "smart relays" at each solenoid. The electronics associated with each solenoid has a selected address. A two-wire control line sends coded signals which activate switches and electronics at a desired solenoid, open circuiting others in the array. Power is conveyed by direct current in one heavy gauge line, the ground or return path being provided by the casing itself.

For a transmitter, the control line selects the desired transmitter (located at the correct address), thereby connecting the power to the transmitter electronics and thereafter supplying the frequency and timing to control the transmitter for the duration of the measurement. A second pair of wires conveys a measure of the actual transmitter current to the surface.

For a receiver, the first pair of control lines selects the desired unit and connects power to its electronics and the second pair conveys the measured solenoid out put to the surface. Such a permanently installed system would be simple and robust.

Other connection schemes are known in the art and may be used with the invention. The manner of connecting downhole equipment and surface equipment is not intended to limit the scope of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining characteristics of geologic formations between wellbores, the method comprising:

activating at least one transmitter to generate a first magnetic field, the at least one transmitter disposed about an external surface of a conductive liner at a selected depth in a first wellbore;

detecting a formation magnetic field induced by the first magnetic field with at least one receiver disposed about an external surface of a conductive liner at a selected depth in a second wellbore; and determining a characteristic of the geologic formation from the detected formation magnetic field.

2. The method of claim 1, wherein the first magnetic field comprises a time-varying magnetic field.

3. The method of claim 1, wherein the characteristic comprises a resistivity of the geologic formation.

4. The method of claim 1, wherein the detecting comprises signal averaging over a selected time so as to increase a signal to noise ratio of the detected formation magnetic field.

5. The method of claim 4, further comprising reducing power used to generate the first magnetic field.

6. The method of claim 1, wherein the conductive liners disposed in the first and second wellbores comprises slots proximate at least one of the at least one transmitter and the at least one receiver.

7. A method for determining characteristics of geologic formations between wellbores, the method comprising:

activating a first of a plurality of axially spaced transmitters to generate a first magnetic field, the plurality of transmitters disposed about an external surface of a conductive liner at selected depths in a first wellbore;

detecting a first formation magnetic field induced by the first magnetic field with a first of a plurality of axially spaced receivers, the plurality of receivers disposed about an external surface of a conductive liner at selected depths in a second wellbore;

detecting the first formation magnetic field induced by the first magnetic field with a second of the plurality of receivers; and calculating a first amplitude ratio from the first formation magnetic fields detected by the first and second of the plurality of receivers.

8. The method of claim 7, further comprising:

activating a second of the plurality of transmitters to generate a second magnetic field;

detecting a second formation magnetic field induced by the second magnetic field with the first of the plurality of receivers;

detecting the second formation magnetic field induced by the second magnetic field with the second of the plurality of receivers;

calculating a second amplitude ratio from the second formation magnetic fields detected by the first and second of the plurality of receivers;

calculating a third amplitude ratio from the first amplitude ratio and the second amplitude ratio; and determining a characteristic of the geologic formation from the third amplitude ratio.

9. The method of claim 7, wherein the first magnetic field comprises a time-varying magnetic fields.

10. The method of claim 8, wherein the second magnetic field comprises a time-varying magnetic field.

11. The method of claim 7, further comprising repeating the activating and detecting at different selected ones of the plurality of transmitters and receivers, and repeating the calculating to determine characteristics of geologic formations at a plurality of depths.

12. The method of claim 8, wherein the characteristic comprises a resistivity of the geologic formation.

13. The method of claim 7, wherein the conductive liner disposed in the first wellbore comprises slots proximate each of the plurality of transmitters.

14. The method of claim 7, wherein the conductive liner disposed in the second wellbore comprises slots proximate each of the plurality of receivers.

15. The method of claim 7, wherein the plurality of transmitters comprises solenoids wound on the exterior of the conductive liner.

16. The method of claim 7, wherein the plurality of receivers comprises solenoids wound on the exterior of the conductive liner.

17. The method of claim 7, wherein the detecting comprises signal averaging over a selected time so as to increase a signal to noise ratio of the detected formation magnetic fields.

18. The method of claim 17, further comprising reducing power used to generate the first magnetic field.

19. The method of claim 8, wherein the detecting comprises signal averaging over a selected time so as to increase a signal to noise ratio of the detected formation magnetic fields.

20. The method of claim 19, further comprising reducing power used to generate the second magnetic field.

21. A method for determining characteristics of geologic formations between wellbores, the method comprising:
   activating a first transmitter at a first selected depth to generate a first magnetic field, the first transmitter disposed on a drilling tool disposed at a selected depth in a first wellbore;
   detecting a first formation magnetic field induced by the first magnetic field with a first of a plurality of axially spaced receivers, the plurality of receivers disposed about an external surface of a conductive liner at selected depths in a second wellbore;
   detecting the first formation magnetic field induced by the first magnetic field with a second of the plurality of receivers; and
   calculating a first amplitude ratio from the first formation magnetic fields detected by the first and second of the plurality of receivers.

22. The method of claim 21, further comprising:
   activating the first transmitter at a second selected depth to generate a second magnetic field;
   detecting a second formation magnetic field induced by the second magnetic field with the first of the plurality of receivers;
   detecting the second formation magnetic field induced by the second magnetic field with the second of the plurality of receivers;
   calculating a second amplitude ratio from the second formation magnetic fields detected by the first and second of the plurality of receivers;
   calculating a third amplitude ratio from the first amplitude ratio and the second amplitude ratio; and
   determining a characteristic of the geologic formation from the third amplitude ratio.

23. The method of claim 21, wherein the first magnetic field comprises a time-varying magnetic field.

24. The method of claim 22, wherein the second magnetic field comprises a time-varying magnetic field.

25. The method of claim 22, wherein the characteristic comprises a resistivity of a geologic formation.

26. The method of claim 21, wherein the plurality of receivers comprises solenoids wound on the external surface of the conductive liner.

27. A method for telemetering data between wellbores, the method comprising:
   activating a first transmitter to generate a first magnetic field, the first transmitter disposed on a drilling tool disposed in a first wellbore;
   detecting a formation magnetic field induced by the first magnetic field with at least one receiver, the at least one receiver disposed about an external surface of a conductive liner at a selected depth in a second wellbore; and
   determining a drilling tool characteristic from the detected formation magnetic field.

28. The method of claim 27, wherein the first wellbore comprises a conductive casing.

29. The method of claim 27, wherein the characteristic comprises drill bit revolutions per minute.

30. A system for determining characteristics of geologic formations between conductively lined wellbores, comprising:
   at least two axially spaced apart electromagnetic transmitters positioned at selected depths in a first wellbore and disposed about an external surface of a conductive liner;
   at least two axially spaced apart electromagnetic receivers positioned at selected depths in a second wellbore and disposed about an external surface of a conductive liner; and
   at least one surface control station operatively coupled to the at least two transmitters and the at least two receivers, the at least one surface control station adapted to selectively activate each of the at least two electromagnetic transmitters to generate first magnetic fields and to selectively activate each of the at least two electromagnetic receivers to detect formation magnetic fields induced by the first magnetic fields.

31. The system of claim 30, wherein the conductive liner disposed in the first wellbore comprises slots proximate each of the at least two electromagnetic transmitters.

32. The system of claim 30, wherein the conductive liner disposed in the second wellbore comprises slots proximate each of the at least two electromagnetic receivers.

33. The system of claim 30, further comprising means for calculating an amplitude ratio from the formation magnetic fields detected by the at least two electromagnetic receivers.

34. The system of claim 33, further comprising means for determining a characteristic of the geologic formation from the calculated amplitude ratio.

35. The system of claim 30, wherein the at least two electromagnetic transmitters comprise solenoids wound on the exterior of the conductive liner.

36. The system of claim 30, wherein the at least two electromagnetic receivers comprise solenoids wounds on the exterior of the conductive liner.

37. A system for determining characteristics of geologic formations between conductively lined wellbores, comprising:
   a plurality of axially spaced electromagnetic transmitters disposed about an external surface of a conductive liner at selected depths in a first wellbore, the plurality of electromagnetic transmitters adapted to generate first magnetic fields;
   a plurality of axially spaced electromagnetic receivers disposed about an external surface of a conductive liner at selected depths in a second wellbore, the plurality of electromagnetic receivers adapted to detect formation magnetic fields induced by the first magnetic fields;
   means for calculating an amplitude ratio from the detected formation magnetic fields; and
   means for determining a characteristic of the geologic formation from the amplitude ratio.

38. The system of claim 37, wherein the first magnetic fields are time-varying magnetic fields.

39. The system of claim 37, wherein the means for calculating an amplitude ratio is adapted to detect formation magnetic fields at different selected ones of the plurality of receivers, wherein the detected formation magnetic fields are induced by first magnetic fields generated by different selected ones of the plurality of transmitters, the means for calculating further adapted to calculate the amplitude ratio to determine characteristics of geologic formations at a plurality of depths by selecting operation of appropriate ones of the transmitters and receivers.

40. The system of claim 37, wherein the characteristic comprises a resistivity of the geologic formation.

41. The system of claim 37, wherein the conductive liner comprises slots proximate each of the plurality of transmitters.

42. The system of claim 37, wherein the conductive liner comprises slots proximate each of the plurality of receivers.

43. The system of claim 37, wherein the plurality of transmitters comprises solenoids wound on the exterior of the conductive liner.

44. The system of claim 37, wherein the plurality of receivers comprises solenoids wound on the exterior of the conductive liner.

45. The system of claim 37, wherein at least one surface control system coupled to the plurality of receivers is adapted to signal average over a selected time so as to increase a signal to noise ratio of the detected formation magnetic fields.

46. The system of claim 45, wherein the at least one surface control system is adapted to reduce power used to generate the first formation magnetic fields.

47. A system for determining characteristics of geologic formations proximate a conductively lined wellbore, comprising:
a plurality of axially spaced electromagnetic transmitters disposed about an external surface of a conductive liner at selected depths in a wellbore, the plurality of electromagnetic transmitters adapted to generate first magnetic fields;
a plurality of axially spaced electromagnetic receivers disposed about an external surface of a conductive liner at selected depths in the wellbore, the plurality of electromagnetic receivers adapted to detect formation magnetic fields induced by the first magnetic fields;
means for calculating an amplitude ratio from the detected formation magnetic fields; and
means for determining a characteristic of the geologic formation from the amplitude ratio.

48. The system of claim 47, wherein the first magnetic fields are time-varying magnetic fields.

49. The system of claim 47, wherein the means for calculating an amplitude ratio is adapted to detect formation magnetic fields at different selected ones of the plurality of receivers, wherein the detected formation magnetic fields are induced by first magnetic fields generated by different selected ones of the plurality of transmitters, the means for calculating further adapted to calculate the amplitude ratio to determine characteristics of geologic formations at a plurality of depths by selecting operation of appropriate ones of the transmitters and receivers.

50. The system of claim 47, wherein the characteristic comprises a resistivity of the geologic formation.

51. The system of claim 47, wherein the conductive liner comprises slots proximate each of the plurality of transmitters.

52. The system of claim 47, wherein the conductive liner comprises slots proximate each of the plurality of receivers.

53. The system of claim 47, wherein the plurality of transmitters comprises solenoids wound on the exterior of the conductive liner.

54. The system of claim 47, wherein the plurality of receivers comprises solenoids wound on the exterior of the conductive liner.

55. The system of claim 47, wherein at least one surface control system coupled to the plurality of receivers is adapted to signal average over a selected time so as to increase a signal to noise ratio of the detected formation magnetic fields.

56. The system of claim 55, wherein the at least one surface control system is adapted to reduce power used to generate the first formation magnetic fields.

* * * * *